United States Patent [19]

Otomo et al.

[11] Patent Number: 4,972,285

[45] Date of Patent: Nov. 20, 1990

[54] AMORPHOUS MAGNETIC ALLOY OF CO-NB-ZR SYSTEM AND MAGNETIC HEAD MADE FROM THE SAME

[75] Inventors: Shigekazu Otomo, Sayama; Noriyuki Kumasaka, Ome; Hideo Fujiwara, Tokorozawa; Shinji Takayama, Mitaka; Takeo Yamashita; Noritoshi Saito, both of Hachioji; Mitsuhiro Kudo, Tokyo, all of Japan

[73] Assignee: Hitachi, Ltd., Tokyo, Japan

[21] Appl. No.: 217,979

[22] Filed: Jul. 12, 1988

Related U.S. Application Data

[63] Continuation of Ser. No. 870,943, Jun. 5, 1986, abandoned, which is a continuation of Ser. No. 600,906, Apr. 16, 1984.

[30] Foreign Application Priority Data

Apr. 15, 1983 [JP] Japan .................................. 58-65276

[51] Int. Cl.[5] ............................................. G11B 5/235

[52] U.S. Cl. .................................... 360/120; 360/126; 148/304; 148/403; 420/435

[58] Field of Search ................ 148/403, 304; 420/435; 360/122, 120, 126

[56] References Cited

U.S. PATENT DOCUMENTS

| | | | |
|---|---|---|---|
| 4,437,912 | 3/1984 | Sakakima et al. | 148/403 |
| 4,488,195 | 12/1984 | Yanagiuchi et al. | 360/125 |
| 4,578,728 | 3/1986 | Sakakima et al. | 360/125 |

FOREIGN PATENT DOCUMENTS

| | | | |
|---|---|---|---|
| 3146031 | 7/1982 | Fed. Rep. of Germany | 420/435 |
| 57-155339 | 3/1981 | Japan . | |
| 56-124112 | 9/1981 | Japan | 360/122 |
| 56-169214 | 12/1981 | Japan | 360/122 |
| 58-55557 | 4/1984 | Japan | 148/403 |
| 59-98314 | 6/1984 | Japan | 360/122 |
| 81-000861 | 4/1981 | PCT Int'l Appl. | 148/403 |

*Primary Examiner*—John P. Sheehan

*Attorney, Agent, or Firm*—Antonelli, Terry, Stout & Kraus

[57] ABSTRACT

An amorphous magnetic alloy of Co-Nb-Zr system contains Co, Nb and Zr and has a composition which falls, in terms of atomic percent, within the region defined by straight lines connecting, in a ternary composition diagram assuming the total of contents of these three elements to be 100, a point (81% Co, 14% Nb, 5 Zr), a point (88% Co, 9% Nb, 3% Zr), a point (86.5% Co, 12.5% Nb, 1% Zr) and a point (81% Co, 18% Nb, 1% Zr). Disclosed also is a magnetic head having a core at least a part of which is constituted by this amorphous magnetic alloy. This magnetic head, when used in combination with a metal powder tape having a high coercive force, provides a remarkably increased recording-reproducing output.

8 Claims, 4 Drawing Sheets

AMORPHOUS MAGNETIC ALLOY OF CO-NB-ZR SYSTEM AND MAGNETIC HEAD MADE FROM THE SAME

This application is a Continuation application of application Ser. No. 870,943, filed Jun. 5, 1986, which is a Continuation application of application Ser. No. 600,906, filed Apr. 16, 1984 both abandoned.

BACKGROUND OF THE INVENTION

The present invention relates to an amorphous magnetic alloy of Co-Nb-Zr system and, more particularly, to an amorphous magnetic alloy of Co-Nb-Zr system suitable for use as the material of magnetic heads, as well as to a magnetic head made from this alloy.

In recent years, the magnetic recording technique has achieved a remarkable progress owing to the development of magnetic tapes with high coercive force and development of materials for high performance magnetic head for use in combination with such magnetic tape. Particularly, metal powder tape having high coercive force affords remarkable improvement in both the output level and C/N ratio (output-noise ratio) in the high recording density region of recording wavelength between several μm and 1 μm or less, as compared with conventional tapes. This in turn makes it possible to attain a remarkable increase in the recording density particularly in the uses which require high recording density such as VTR.

Conventionally, ferrite has been used as the material of the magnetic heads in VTRs. The magnetic head made of ferrite, however, has a saturation flux density which is about 5,000 gauss at the greatest, so that it cannot provide sufficiently large recording field. Under this circumstance, there is an increasing demand for magnetic heads made of metallic magnetic materials having high saturation flux density, in order to enjoy the advantages of the metal powder tape with high coercive force.

Hitherto, crystalline alloys such as Fe-Al-Si system alloys or Fe-Ni system alloys have been used and, in recent years, amorphous magnetic alloys have been developed to cope with this demand. The crystalline alloys such as Fe-Al-Si system alloys and Fe-Ni system alloys, however, have magneto crystalline anisotropy due to their crystalline nature. In order to obtain excellent magnetic properties suitable to the magnetic heads, particularly high magnetic permeability, it is desirable that the composition of the material approximates the composition which nullifies the magneto-crystalline anisotropy. Insofar as the material is used for magnetic heads, it is also necessary to substantially nullify the magnetostriction constant. These requirements undesirably limit the range of composition usable as the material of the magnetic heads and, hence, make the production difficult due to difficulty in the control of composition.

On the other hand, amorphous magnetic alloy offers various advantages. Namely, the amorphous magnetic alloy, which exhibits no magneto-crystalline anisotropy, can have wide selection of composition because only the magnetostriction constant has to be adjusted. In addition, even if the magnetic permeability is degraded due to induced magnetic anisotropy, the original magnetic permeability can easily be recovered by a suitable heat treatment. Moreover, the amorphous magnetic alloys can possess high saturation flux density and high coercive force which could never be attained by crystalline alloys. Furthermore, the amorphous magnetic alloys suffer from only small eddy current loss due to a high electric resistance. There are two types of amorphous alloys of the kind described: namely, metal-metal system amorphous alloy which does not contain any metalloid element and contains metallic element as the glass former element; and metal-metalloid system amorphous alloy containing metalloid element as the glass former element. The metal-metal system amorphous alloy is more suitable for use as the magnetic head material than the metal-metalloid system amorphous alloy because the former has higher crystallization temperature and higher corrosion and wear resistances than the latter.

Hitherto, these amorphous magnetic alloys have been produced by a splat cooling process, in the form of films having thicknesses ranging between 10 and 50 μm. In recent years, however, a remarkable progress has been made in the field of technique for forming thin films, e.g. sputtering, and it has become possible to produce even an amorphous magnetic alloy of such a composition as could never be produced due to oxidation of the specimen. The current technique for forming thin films permits also an easy lamination of the amorphous alloy films and insulating films such as oxide films. This in turn permits the production of a material having reduced eddy current loss and, hence, suited for use as the material of heads in devices operating at high frequency, e.g. VTRs and computers. The current thin film forming technique is applicable also to the production of composite type magnetic head in which the amorphous magnetic alloy is used only in the portion of the magnetic head around the gap while the other portions are made of ferrite, as well as to thin film magnetic recording head.

Japanese Patent Application Laid-Open Publications Nos. 55-138049, 56-84439 and 57-155339 disclose metal-metal system amorphous magnetic alloys, particularly amorphous magnetic alloys containing Zr as the glass former element which are comparatively easy to produce and which have superior properties.

The present inventors have produced thin film of the above-mentioned amorphous magnetic alloy containing Zr by sputtering method and measured the properties of the product film. As a result, the present inventors have found that the amorphous magnetic alloys of Co-Nb-Zr system having compositions disclosed in the above-mentioned Laid-Open Publications and possessing saturation flux density of about 7.5 kG or greater generally exhibit comparatively large magnetostriction constant and, therefore, are rather unsuitable for use as the material of the magnetic heads.

SUMMARY OF THE INVENTION

Accordingly, it is a primary object of the invention to provide an amorphous magnetic alloy of Co-Nb-Zr system having a saturation flux density of 7.5 kG or greater and extremely small absolute value of magnetostriction constant, particularly an amorphous magnetic alloy produced by a thin film forming technique such as sputtering, as well as a magnetic head of high performance produced from such amorphous magnetic alloy.

The present inventors have experimentally produced amorphous magnetic alloys containing various amounts of Zr as the glass former element and measured properties of these alloys. The inventors, as a result of this measurement, found that an extremely small absolute value of magnetostriction constant including zero, as well as magnetostriction constant which is slightly below zero, can be obtained rather in a region which does not fall within the composition ranges disclosed in the above-mentioned Laid-Open Publications. The present invention is based upon this discovery.

Namely, according to one aspect of the invention, there is provided an amorphous magnetic alloy of Co-Nb-Zr system, the alloy containing Co, Nb and Zr and having a composition which falls, in terms of atomic percent, within the region defined by straight lines connecting, in a ternary composition diagram assuming the total of contents of these three elements to be 100, a point (81% Co, 14% Nb, 5% Zr), a point (88% Co, 9% Nb, 3% Zr), a point (86.5% Co, 12.5% Nb, 1% Zr) and a point (81% Co, 18% Nb, 1% Zr).

A further improved properties is obtained when the composition of the amorphous magnetic alloy of Co-Nb-Zr system falls, in terms of atomic percent, within the region defined by straight lines connecting, in the ternary composition diagram, a point (83% Co, 13% Nb, 4% Zr), a point (86% Co, 11% Nb, 3% Zr), a point (85% Co, 13% Nb, 2% Zr) and a point (83% Co, 15% Nb, 2% Zr).

According to another aspect of the invention, there is provided a magnetic head having a core at least a part of which is constituted by the above-mentioned amorphous magnetic alloy of Co-Nb-Zr system. It is also possible to substitute a part of the magnetic material constituting the core of the conventional magnetic head with the amorphous magnetic alloy of Co-Nb-Zr system mentioned above.

A magnetic head may be produced with the above-mentioned amorphous magnetic alloy of the invention by depositing the alloy on a ferromagnetic substrate by sputtering so that only the portion requiring high saturation flux density is constituted by the amorphous magnetic alloy while other portion is constituted by ferromagnetic ferrite. This magnetic head is easy to produce and exhibits a superior performance.

DESCRIPTION OF THE PRESENTLY PREFERRED EMBODIMENTS

Figure 1:
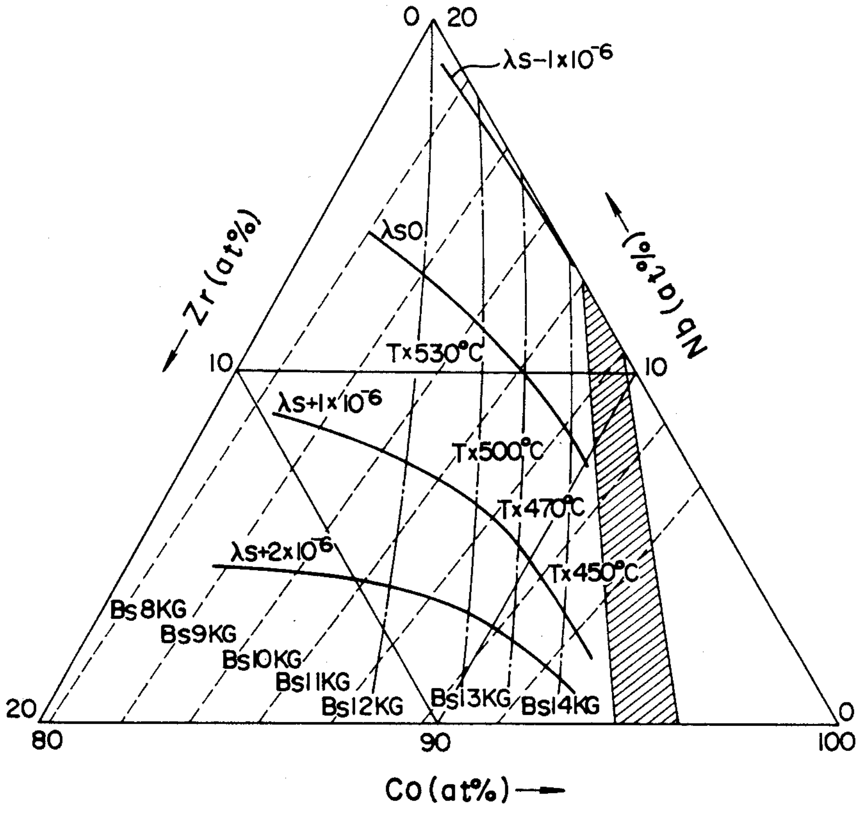
FIG. 1 is a diagram showing the relationship between compositions and properties of amorphous magnetic alloys of Co-Nb-Zr system for explaining the invention.

Amorphous magnetic alloys of Co-Nb-Zr system of different compositions were experimentally produced by a radio frequency diode sputtering apparatus. FIG. 1 shows the relationship between the compositions of the amorphous magnetic alloy and the properties of the same such as saturation flux density Bs, magnetostriction constant λs and crystallization temperature Tx. In this experiment, the sputtering was conducted under the condition of argon pressure of $5\times10^{-3}$ Torr., RF input power of 250 W and water cooling of substrate. The film thickness was about 1.5 μm. More specifically, FIG. 1 shows only a part of a Co-Nb-Zr ternary composition diagram having Co content of not smaller than 80 atomic % (expressed simply by "%", hereinunder). In this Figure, the hatched area shows the boundary region between the amorphous region and crystalline region. Namely, the alloy having Co content greater than that of this boundary region takes a crystalline state, while the alloys having smaller Co content takes amorphous state. The alloys having compositions falling within this boundary region can take either crystalline or amorphous state or a state in which amorphous phase and crystalline phase coexist, depending on the change in the condition of production of the alloy. In this Figure, different levels of saturation flux density Bs are shown by different broken-line curves. It will be seen that the saturation flux density Bs is increased as the Co content becomes greater. On the other hand, different levels of crystallizing temperature Tx are shown by different chain-line curves. It will be seen that the crystallizing temperature Tx becomes lower as the Co and Nb contents are increased. Full line curves show different levels of magnetostriction constant λs. It will be seen that the magnetostriction constant λs is about $-1\times10^{-6}$ when the Zr content is 0% and about $+3\times10^{-6}$ when the Nb content is 0%. It will be seen that the magnetostriction constant is zero when the ratio Nb/Zr between the Nb and Zr contents is substantially 3:1. In the region of amorphous alloy, the coercive force is as small as about 0.2 Oe. Thus, in the compositions having Co content not smaller than 80%, there is a region in which the magnetostriction constant is zero or the absolute value of the magnetostriction constant is extremely small or the magnetostriction constant is slightly below zero, within the range of Zr content not greater than 5%. These properties are obtainable also with the amorphous magnetic alloy films produced by other thin film forming method such as triode or tetrode plasma high rate sputtering method, high rate magnetron sputtering method, ion beam sputtering method, ion plating method, vacuum evaporation method and so forth.

Hitherto, it has been believed that the composition range having Zr content of not greater than 5% cannot be practical as the composition for amorphous magnetic alloy. For instance, Japanese Patent Application Laid-Open Publication No. 55-138049 states that the production of amorphous magnetic alloy is difficult with the composition having Zr content of not greater than 5%, while Japanese Patent Application Laid-Open Publication No. 56-84439 states that the production of amorphous magnetic alloy is not easy when the Zr content is 7% or less. Further, Japanese Patent Application Laid-Open Publication No. 57-155339 also states that Zr content less than 7% is not preferred for the production of amorphous magnetic alloy because such a small Zr content makes the alloy brittle undesirably.

In sharp contrast to the above common knowledge, the invention is to provide an amorphous magnetic alloy having a magnetostriction constant which is zero or whose absolute value is extremely small or which is slightly below zero, within the unobvious composition range having Zr content of not greater than 5%.

Figure 2:
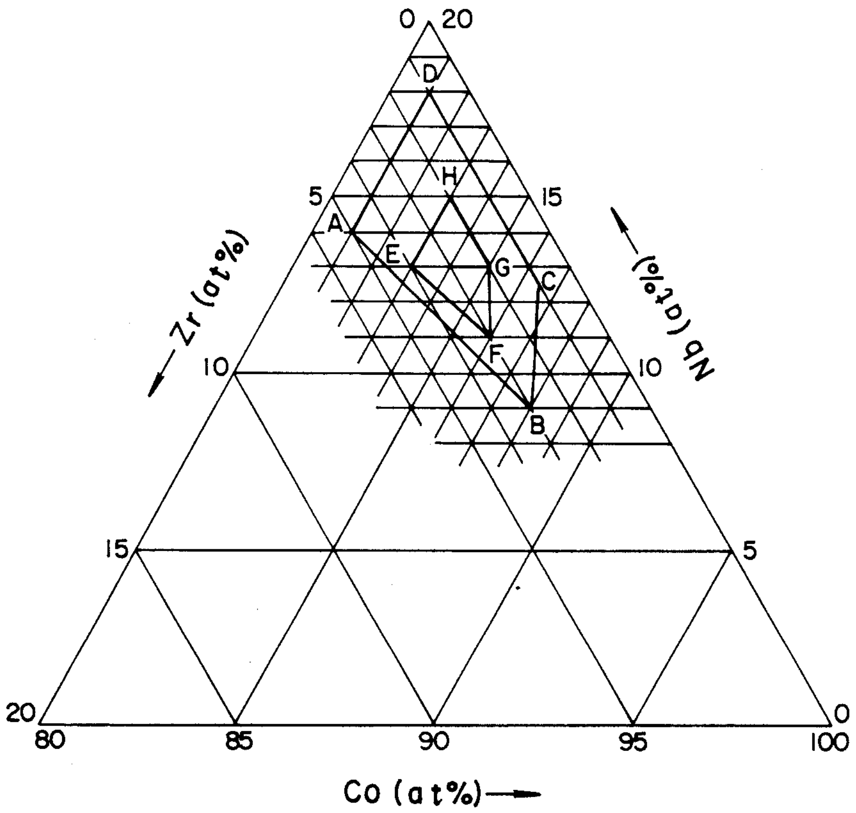
FIG. 2 is a ternary composition diagram showing the composition range of an amorphous magnetic alloy of Co-Nb-Zr system in accordance with the invention.

As will be clear from the result of the experiment described before, the amorphous magnetic alloy of Co-Nb-Zr system of the invention suitable for use as the material of magnetic heads had a composition which falls within the region defined by straight lines connecting, in a ternary composition diagram shown in FIG. 2, point A (81% Co, 14% Nb, 5% Zr), point B (88% Co, 9% Nb, 3% Zr), point C (86.5% Co, 12.5% Nb, 1% Zr) and point D (81% Co, 18% Nb, 1% Zr). If the Co content is smaller than the line connecting the points A and D, the saturation flux density of the alloy comes down below about 7.5 kG undesirably to negate the advantage offered by the invention, i.e. saturation flux density higher than that of ferrite which has been used conventionally. On the other hand, a Zr content greater than the line connecting the points A and B causes a large magnetostriction constant of about $0.2\times10^{-6}$ or greater which is quite unsuitable for the magnetic head material. When the Co content is greater than the line connecting the point B and C, the crystallization temperature is undesirably lowered down below 460° C. A Zr content smaller that the line connecting the points C and D causes the magnetostriction constant to take a negative value of which absolute value being $0.7\times10^{-6}$ to $0.8\times10^{-6}$ which is too large to make the alloy usable for the magnetic heads. As will be seen from FIG. 1, the addition of Zr to the amorphous magnetic alloy of Co-Nb system is effective because it broadens the composition ranges for amorphous state, decreases the magnetostriction constant and increases the crystallization temperature. These effects become appreciable when the Zr content exceeds 1%.

According to a more preferred form, the amorphous magnetic alloy of Co-Nb-Zr system of the invention has a composition which falls within the region defined by straight lines connecting, in a ternary composition diagram shown in FIG. 2, point E (83% Co, 13% Nb, 4% Zr), point F (86% Co, 11% Nb, 3% Zr), point G (85% Co, 13% Nb, 2% Zr) and point H (83% Co, 15% Nb, 2% Zr). The reasons why this region is more preferred are as follows. Namely, any Zr content exceeding the line connecting the points E and F makes a magnetostriction constant greater than 0 substantially. When the Co content is greater than the line connecting the points F and G, the crystallization temperature undesirably comes down below about 490° C. A Zr content smaller than the line connecting the points G and H causes the magnetostriction constant to take a negative value of which absolute value being greater than about $0.5\times10^{-6}$. When the Co content is smaller than the line connecting the points H and E, the saturation flux density becomes smaller than about 8.7 kG.

When the amorphous magnetic alloy of the invention is used as the material of magnetic heads or the like, in most cases, the alloy after production is preferably subjected to a heat treatment with or without the influence of magnetic field, as in the case of other known amorphous alloys, before it is put into use. In the production of an amorphous magnetic alloy film by a thin film forming technique such as sputtering, it is a common measure to use a material, as the substrate, having a thermal expansion coefficient smaller than that of the amorphous magnetic alloy. Examples of such a substrate material are glass, ceramics, non-magnetic ferrite, ferromagnetic ferrite, Si wafer or the like. When the amorphous magnetic alloy film coated on the substrate undergoes a heat treatment, a tensile stress is applied to the film in the plane parallel to plane of the film. In this case, when the magnetostriction constant takes a positive value, the axis of easy magnetization appears in the direction of the tensile stress, i.e. in the direction parallel to the plane of the film, whereas when the magnetostriction constant takes a negative value, the axis of easy magnetization appears in the direction perpendicular to the plane of the film. In general, the magnetic permeability at radio frequency of the material having uniaxial magnetic anisotropy is small when measured in the direction of axis of easy magnetization and large when measured in the direction perpendicular to the direction of axis of easy magnetization. Therefore, in the magnetic head which is operated by the magnetic flux flowing in the direction of the plane of the amorphous magnetic alloy film coated on the substrate, it is preferred that the film has a magnetostriction constant slightly below zero because, in such a case, a high magnetic permeability appears towards the inside of the amorphous magnetic alloy film. However, a negative magnetostriction constant having a large absolute value, e.g. greater than $0.8\times10^{-6}$, rather reduces the magnetic permeability. In also the case of ordinary thin film magnetic head having a rectangular magnetic path in the thin magnetic film coated on the substrate and operated by the magnetic flux flowing in the longitudinal direction thereof, a higher magnetic permeability in the longitudinal direction is obtained by causing the magnetostriction constant to take a negative value, because the tensile stress is applied in the longitudinal direction. Similar phenomenon takes place in a magnetic head in which a ribbon-shaped amorphous magnetic alloy is used in combination with a glass, ceramics, or non-magnetic or ferromagnetic ferrite. Thus, the amorphous magnetic alloy as the material of magnetic heads preferably has a magnetostriction constant which is slightly below zero. For this reason, as mentioned before the composition of the amorphous magnetic alloy of the invention is selected to contain greater region for negative magnetostriction constant than for positive magnetostriction constant.

The production of magnetic head essentially employs various heating steps. For instance, in the production of magnetic head of VTR, halves of the head core are connected to each other through a functional gap, usually by means of a bonding glass. This bonding glass has to be treated at least about 410° C., even in the case of glass having the lowest melting point. Namely, it is quite difficult to bond the core halves at a temperature below about 410° C. by means of the bonding glass. When the bonding is conducted at 410° C., the amorphous magnetic alloy used as the head material preferably has a crystallization temperature of not lower than 460° C. For conducting the glass bonding in the magnetic head production process stably at a high yield, it is preferred that the bonding is made at a temperature not lower than 440° C. This in turn requires the crystallization temperature of the amorphous magnetic alloy not lower than 490° C. On the other hand, amorphous magnetic alloy having a saturation flux density of not greater than 8.7 kG cannot provide a magnetic head which has recording characteristics well matching for the high coercive force of metal powder tape, but a performance superior to that of conventional ferrite magnetic head can be obtained if the saturation flux density is not smaller than 7.5 kG.

As has been explained above, the amorphous magnetic alloy of Co-Nb-Zr system in accordance with the invention has a magnetostriction constant ranging between about $-0.8\times10^{-6}$ and about $+0.2\times10^{6}$. Thus, the magnetostriction constant of the amorphous magnetic alloy of invention has an extremely small absolute value, and the composition thereof is selected to have greater part in the area for negative magnetostriction constant than in the area for positive magnetostriction constant. In addition, the saturation flux density is as large as about 7.5 kG at the smallest and can be increased up to about 11.5 kG by suitably selecting the composition. In addition, the crystallization temperature is higher than about 460° C. and can be increased to about 550° C. by suitably selecting the composition.

The advantages of the invention cannot be impaired even if the amorphous magnetic alloy of the invention contains slight amounts of impurities or additives.

Figure 3:
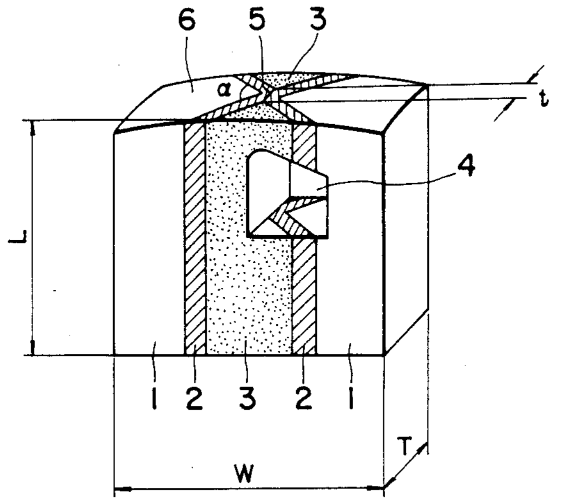
FIG. 3 is a perspective view of a magnetic head made of an amorphous magnetic alloy in accordance with the invention.

EMBODIMENTS:

A description will be made hereinunder as to an example of the magnetic head making use of an amorphous magnetic alloy of Co-Nb-Zr system of the invention. Namely, FIG. 3 shows a composite type magnetic head produced using an alloy of the invention. More specifically, this magnetic head was produced by forming, on an Mn-Zn ferrite substrate, an amorphous magnetic alloy having a composition consisting of, by atomic percent, 84.5% of Co, 13% of Nb and 2.5% of Zr and a thickness of about 20 μm, by a radio frequency sputtering conducted under an argon pressure of $5\times10^{-3}$ Torr. Thus, the magnetic head in accordance with the invention has a single crystal 1 of Mn-Zn ferrite serving as the substrate, an amorphous magnetic alloy film 2, a bonding glass 3, a window 4 for winding and a functional gap 5. The head is so sized as to have a ferrite apex angle α of 60°, track width t of 28 μm, core thickness T of 140 μm, core width W of 2 mm, core height L of 1.7 mm, gap length of 0.3 μm and a gap depth of 45 μm. The magnetic properties of the amorphous magnetic alloy film 2 used in this magnetic head were: 9.5 kG in saturation flux density, 0.2 Oe in coercive force, 510° C. in crystallization temperature and $-0.3\times10^{-6}$ in magnetostriction constant. As the bonding glass 3 for bonding the magnetic core halves and for filling the groove around the functional gap, a glass having a low melting point and containing PbO as the major constituent was used at a bonding temperature of 450° C.

Figure 4:
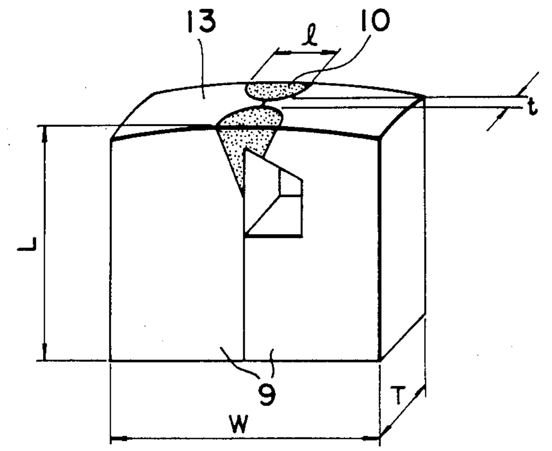
FIG. 4 is a perspective view of a conventional magnetic head formed from single crystal of Mn-Zn ferrite, for the purpose of comparison of head properties.

For the purpose of comparison of the magnetic properties with the magnetic head of the invention, a comparison magnetic head was produced using the conventional material of Mn-Zn ferrite single crystal as shown in FIG. 4. In this Figure, a reference numeral 9 denotes an Mn-Zn ferrite single crystal, while 10 denotes a filler glass. This comparison magnetic head was sized to have equal track width t, core thickness T, core width W, core length L, gap length and gap depth to those of the magnetic head of the invention. Length l of the narrow track in the tape sliding surface 13 was selected to be 200 μm.

Windings were applied on the magnetic head of the invention and the comparison magnetic head to measure the inductance values of these heads. As a result, it was confirmed that both heads showed substantially equal inductance value.

Figure 5:
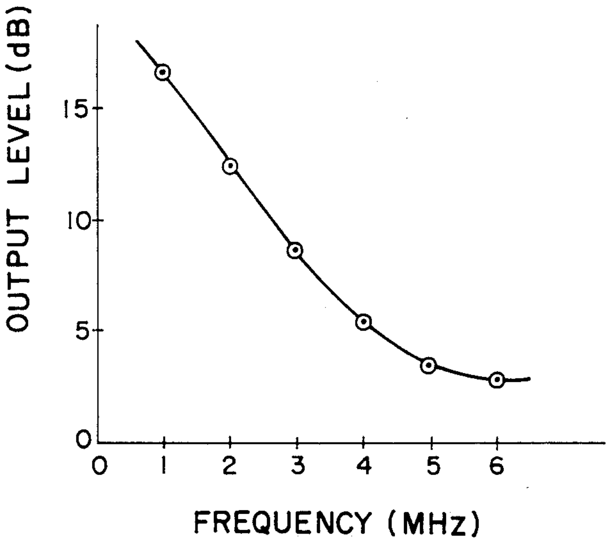
FIG. 5 is a graph showing the properties of the magnetic head made of an amorphous magnetic alloy in accordance with the invention.

FIG. 5 shows the recording-reproducing outputs as measured using a metal powder tape of Hc 1260 Oe at a relative tape running speed of 5.8 m/s. As will be seen from this Figure, the magnetic head of the invention provides a remarkable increase in the output level which amounts to 3 to 17 dB at frequency range of 1 to 6 MHz, when the recording-reproducing output of the Mn-Zn ferrite single crystal head is set to 0 dB.

Figure 6:
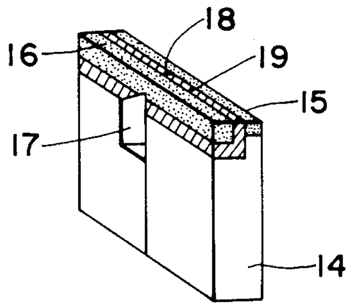
FIGS. 6 and 7 are perspective views of other examples of magnetic head made of the amorphous magnetic alloy of the invention.
Figure 7:
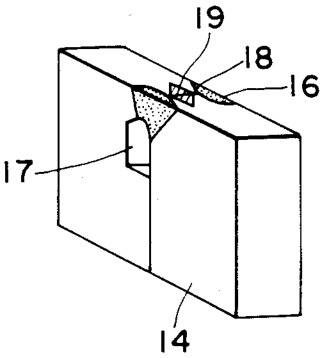

FIGS. 6 and 7 show different magnetic heads in accordance with the invention, produced from sputtered thin film of Co-Nb-Zr system amorphous magnetic alloy similar to that of the embodiment described hereinbefore. In these Figures, a reference numeral 19 denotes an amorphous magnetic alloy film, 14 denotes a single crystal of Mn-Zn ferrite, 15 denotes a non-magnetic material, 16 denotes a bonding glass, 17 denotes a window for winding, and 18 denotes a functional gap. The magnetic heads of the invention shown in these Figure also showed remarkable increase in the output over the conventional magnetic head using single crystal of Mn-Zn ferrite.

As has been described above, the amorphous magnetic alloy of the invention can be used quite advantageously as a magnetic material with high permeability in various magnetic heads which are composed of a substrate and a film of magnetically permeable material formed on the substrate. It will be clear also that the shapes and constructions of the magnetic heads of the described embodiments are not exclusive and the advantages of the invention can equally be obtained when the invention is applied to magnetic heads having different shapes and constructions. Usually, this film of magnetic material having high magnetic permeability is disposed at least around the functional gap in the magnetic head. In the case of a magnetic head for perpendicular recording, it is general to use this material as the material of the main pole.

A magnetic head similar to that shown in FIG. 3 was produced by forming, on an Mn-Zn ferrite substrate, a thin film of amorphous magnetic alloy having a composition consisting of 83.5% of Co, 13% of Nb and 3.5% of Zr, by means of a high rate magnetron sputtering apparatus under an argon pressure of $5\times10^{-3}$ Torr. This amorphous magnetic alloy film showed magnetic properties of 9.3 kG in saturation flux density, 0.2 Oe in coercive force, 530° C. in crystallization temperature and $-0.2\times10^{-6}$ in magnetostriction constant. The magnetic head produced with this amorphous magnetic alloy showed a remarkable increase in the recording-reproducing output level by an amount of 3 to 17 dB over the conventional magnetic head made of Mn-Zn ferrite single crystal, when used in combination with the metal powder tape of high coercive force at frequency range of 1 to 6 MHz, as in the case of the magnetic head described before.

Thus, the amorphous magnetic alloy formed by the high rate magnetron sputtering method and the magnetic head using this alloy exhibit properties substantially equal to those of the alloy and magnetic head produced by the radio frequency diode sputtering method. The use of the high rate magnetron sputtering method, in addition, provides a rate of forming the amorphous magnetic alloy which is about 6 to 12 times as high as that offered by the radio frequency diode sputtering method.

As will be fully realized from the foregoing description, the magnetic head of the invention making use of the amorphous magnetic alloy of the invention advantageously exhibits performance much more excellent than that of the conventional magnetic head which employs Mn-Zn ferrite in the area around the gap.

Obviously, many modifications and variations of the present invention are possible in the light of the above teachings. It is therefore to be understood that within the scope of the appended claims the invention may be practiced otherwise than as specifically described.

What is claimed is:

1. A magnetic head comprising:

a pair of substrates each having a ridge, said pair of substrates being arranged so that the tip of the ridge of each of said pair of substrates is facing the tip of the ridge of the other;

a pair of V-shaped magnetic films which are provided by sputtering on the surfaces of the ridges of said pair of substrates, are at their narrowest juncture adjacent one another and form therebetween a non-magnetic gap, said V-shaped magnetic films being made of an amorphous magnetic alloy of Co-Nb-Zr system and having a composition which falls, in terms of atomic percent, within the region defined by straight lines connecting, in a ternary composition diagram assuming the total of contents of these three elements to be 100, a point (81% Co, 14% Nb, 5% Zr), a point (88% Co, 9% Nb, 3% Zr), a point (86.5% Co, 12.5% Nb, 1% Zr) and a point (81% Co, 18% Nb, 1% Zr), the pair of substrates being made of a material having a smaller coefficient of thermal expansion than that of said amorphous magnetic alloy, the magnetic films each having a negative magnetostriction constant; and bonding glass which bonds said pair of V-shaped magnetic films, the bonding of the pair of V-shaped magnetic films being achieved without crystallization of the amorphous magnetic alloy.

2. A magnetic head according to claim 1, wherein the substrate is made of a material selected from the group consisting of glass, ceramics, non-magnetic ferrite, ferromagnetic ferrite, and silicon.

3. A magnetic head according to claim 1, wherein said composition falls, in terms of atomic percent, within the region defined by straight lines connecting, in said ternary composition diagram, a point (83% Co, 13% Nb, 4%Zr), a point (86% Co, 11% Nb, 3% Zr), a point (85% Co, 13% Nb, 2% Zr) and a point (83% Co, 15% Nb, 2% Zr).

4. A magnetic head according to claim 3, wherein the pair of V-shaped magnetic films are bonded at a temperature not less than 440° C., and the amorphous magnetic alloy has a crystallization temperature not lower than 490° C.

5. A magnetic head according to claim 1, wherein the alloy has a crystallization temperature not lower than 460° C.

6. A magnetic head according to claim 5, wherein the bond provided by the bonding glass is a bond formed at a temperature at least 50° C. lower than the crystallization temperature of the alloy.

7. A magnetic head according to claim 4, wherein the bond provided by the bonding glass is a bond formed at a temperature at least 50° C. lower than the crystallization temperature of the alloy.

8. A magnetic head according to claim 1, wherein said bonding glass is a glass containing PbO as a major constituent.

* * * * *